US008516528B2

(12) United States Patent
Sandoval et al.

(10) Patent No.: US 8,516,528 B2
(45) Date of Patent: Aug. 20, 2013

(54) SYNCHRONIZATION OF 2$^{nd}$ SCREEN APPLICATIONS

(75) Inventors: Frank Sandoval, Louisville, CO (US); George Kakatsakis, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 271 days.

(21) Appl. No.: 12/827,147

(22) Filed: Jun. 30, 2010

(65) Prior Publication Data
US 2012/0002111 A1 Jan. 5, 2012

(51) Int. Cl.
*H04N 7/18* (2006.01)
*H04N 7/173* (2011.01)
*H04N 7/16* (2011.01)

(52) U.S. Cl.
USPC .............. 725/80; 725/131; 725/133; 725/141

(58) Field of Classification Search
USPC .................. 348/500, 553, 564; 725/105–134
See application file for complete search history.

(56) References Cited

U.S. PATENT DOCUMENTS

| 2002/0056129 A1* | 5/2002 | Blackketter et al. | 725/112 |
| 2004/0031058 A1* | 2/2004 | Reisman | 725/112 |
| 2006/0031914 A1* | 2/2006 | Dakss et al. | 725/135 |

* cited by examiner

*Primary Examiner* — Chris Parry
*Assistant Examiner* — William J Kim
(74) *Attorney, Agent, or Firm* — Great Lakes Intellectual Property, PLLC.

(57) ABSTRACT

A method and system to synchronize a user experience between multiple output devices. The synchronization may be facilitated with communications between the multiple output devices timed relative to content, event, actions, and occurrences taking place within media being accessed by at least one of the multiple output devices.

25 Claims, 4 Drawing Sheets

SYNCHRONIZATION OF 2$^{nd}$ SCREEN APPLICATIONS

TECHNICAL FIELD

The present invention relates to synchronizing a second screen (2$^{nd}$) user experience with a primary screen experiences, such as but not limited to synchronizing execution of a 2$^{nd}$ screen application with events taking place in a television program or other media showing on the primary screen.

BACKGROUND

The playback of media may be enhanced with the presentation of an interactive application or logically executing resource, such as by enhancing viewing of a television program on a primary device with interactive functions provided through a second screen (2$^{nd}$) of a computer or a mobile device. It can be difficult and problematic to time the activities and interactions of 2$^{nd}$ screen with the context and events of the television program since the transmission of the television program to the primary device has some latency that may vary depending on a number of ever changing network variables.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

Figure 1:
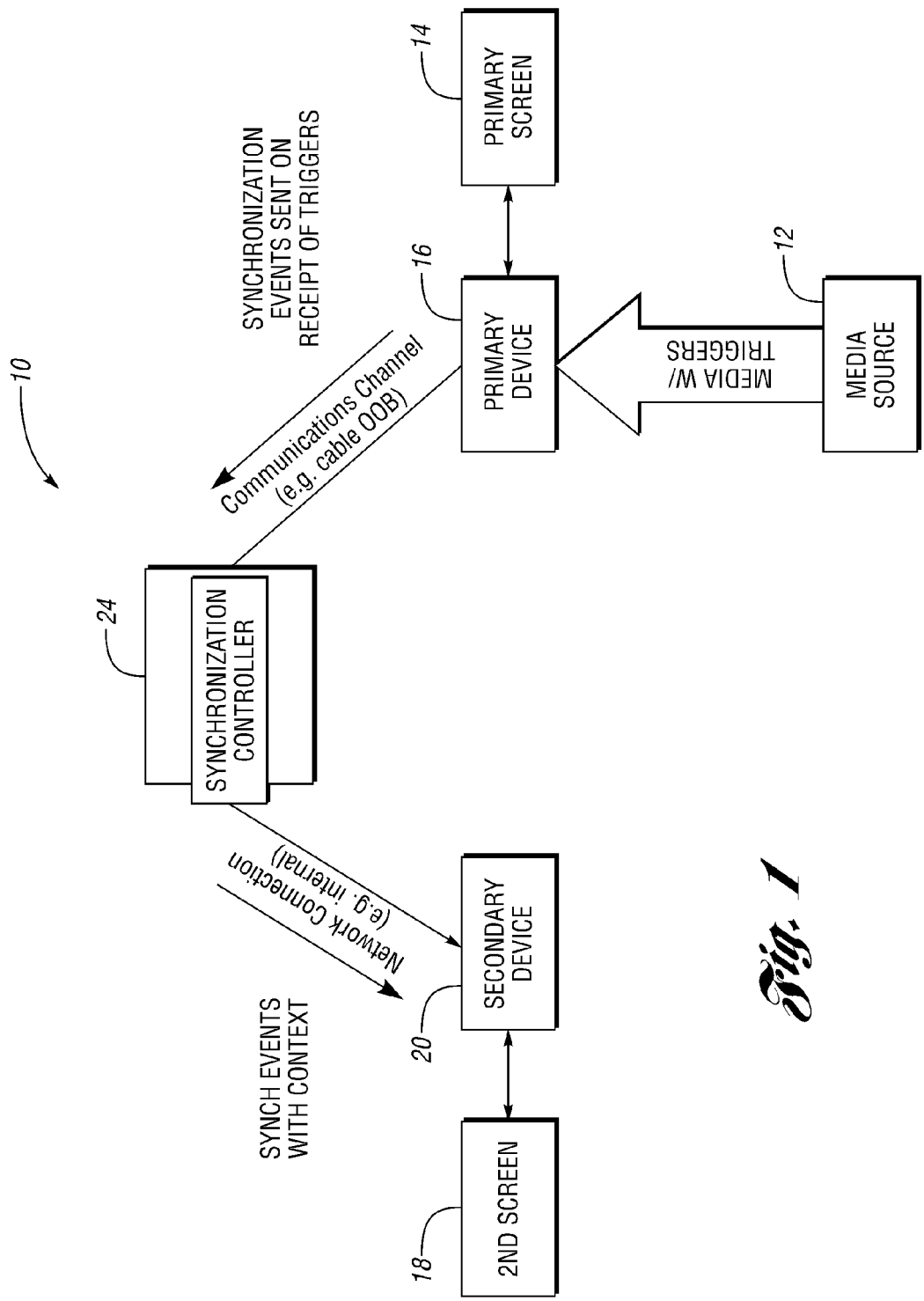
FIG. 1 illustrates a synchronization system in accordance with one non-limiting aspect of the present invention.

FIG. 1 illustrates a synchronization system 10 operable to facilitate synchronizing a second (2$^{nd}$) screen experience with a primary screen experience in accordance with one non-limiting aspect of the present invention. The primary screen experience corresponds with playback of media content received from a media source 12 within a primary screen 14 of a primary playback device 16. The 2$^{nd}$ screen experience corresponds with interactive functions and presentations made through a secondary screen 18 of a secondary device 20, such as through operation of an application executing thereon, to enhance or otherwise augment the user experience provided through the primary screen 14.

Due to latencies and other potential timing difficulties, the system 10 includes a synchronization controller 24 having a server application or other type of logically executing capability suitable to facilitate synchronizing activities of the primary and secondary devices 16, 20, such as to allow 2$^{nd}$ screen functions to be closely synchronized with corresponding primary screen functions, events and content. The synchronization controller 24 may relate to any device or combination of devices and software having capabilities sufficient to support the operations contemplated and described by the present invention, such as but no limited to an iPad, PC browser application synchronized to a cable settop box, a server in a headend, a video on demand (VOD) server, linear or non-linear server, etc.

The primary device 16 may be any type of device capable of interfacing media with a user through the primary screen 14 or other user device, such as but not limited to one or some combination of a television, settop box (STB), computer, mobile device (smartphone, pda), tablet PC (iPad), netbook computer, etc.) The secondary device 20 may be any type of device capable of interfacing media with a user through the 2$^{nd}$ screen 18 or other user device, such as but not limited to one or some combination of a television, settop box (STB), computer, mobile device (smartphone, pda), tablet PC (iPad), netbook computer, etc.)

The present invention contemplates the use of any type of communication media to facilitate communications with each of the primary device 16, secondary device 20, and synchronization controller 24, including but not limited to wireless communications carried out over a wireless network (WIFI, satellite, cellular, telephony, etc.) and/or wireline communications carried out over a wireline network (coaxial cable, Ethernet, USB, home power network, etc.). Optionally, different communication protocols, codecs, standards and communication mediums may be simultaneously relied upon to execute the operations contemplated by the present invention depending on the operation demands and capabilities of each of the primary and secondary devices 16, 20 an synchronization server 24.

The present invention is predominately described with respect to the media content being television related media content for exemplary purposes. The present invention, however, is not intended, unless otherwise noted, to be limited to any particular type of media or media content. With respect the exemplary television related description, the media content may be a television program, such as but not limited to a television program broadcast from a video recorder, media player, and/or network television source directly to the primary device 16 and/or through a intermediary medium of a television service provider 12, such as but not limited to the medium of the type associated with a cable, satellite, or internet television service providers or a mobile phone providers.

The synchronization controller 24 may cooperate with the communication medium(s) and/or other operational requirements of the primary and secondary devices 16, 20 to facilitate the synchronized experience contemplated by the present. One non-limiting aspect of the present invention contemplates the synchronization controller 24 synchronizing the primary and secondary devices 16, 20, or in some cases the function executing on each, according to a "wall-clock" or time of day. This type of uncoordinated synchronization generally corresponds with the secondary device 20 executing functions based on the time of day, i.e., triggering events used to time response events of the secondary device are timed relative to a world clock other universal time stamp. Another method of synchronization that might be used by the synchronization controller 24 may be based on 'media play time'. For time-shifted content that is delivered in a non-broadcast environment, for instance and for on demand service. The synchronization controller 24 might send synchronization events to a secondary device 20 based on offsets from the start of media playback.

Transmission latencies and other time delays or interferences may arise during the transmission of the television program to the primary device 16 such that actions, context, events, and other information originally scheduled to be taking place during a particular time of day may be slightly or greatly delayed by the time the primary device 16 is able to actually output the corresponding portion of the television program for playback. Additionally, local media sources, such as DVRs, and other non-scheduled or time-shifted sources of media content, may similarly be unable to closely correlate support of $2^{nd}$ screen experiences since they rely in a wall-clock or other uncoordinated timer.

One non-limiting aspect of the present invention contemplates refining the uncoordinated synchronization to a more granular level so that the experience in the $2^{nd}$ screen experience can be more closely synchronized with latency adjusted events taking place in the primary screen, including capabilities to support coordinated $2^{nd}$ screen experiences with time-shifted playback devices. Broadcast schedules also become inaccurate as real-time decisions are made regarding the broadcast signal; for instance, a breaking news story can interrupt a program. The only system affected is typically the broadcast stream itself. Updated schedules are typically not pushed out to other systems, such as any secondary devices 20.

Figure 2:
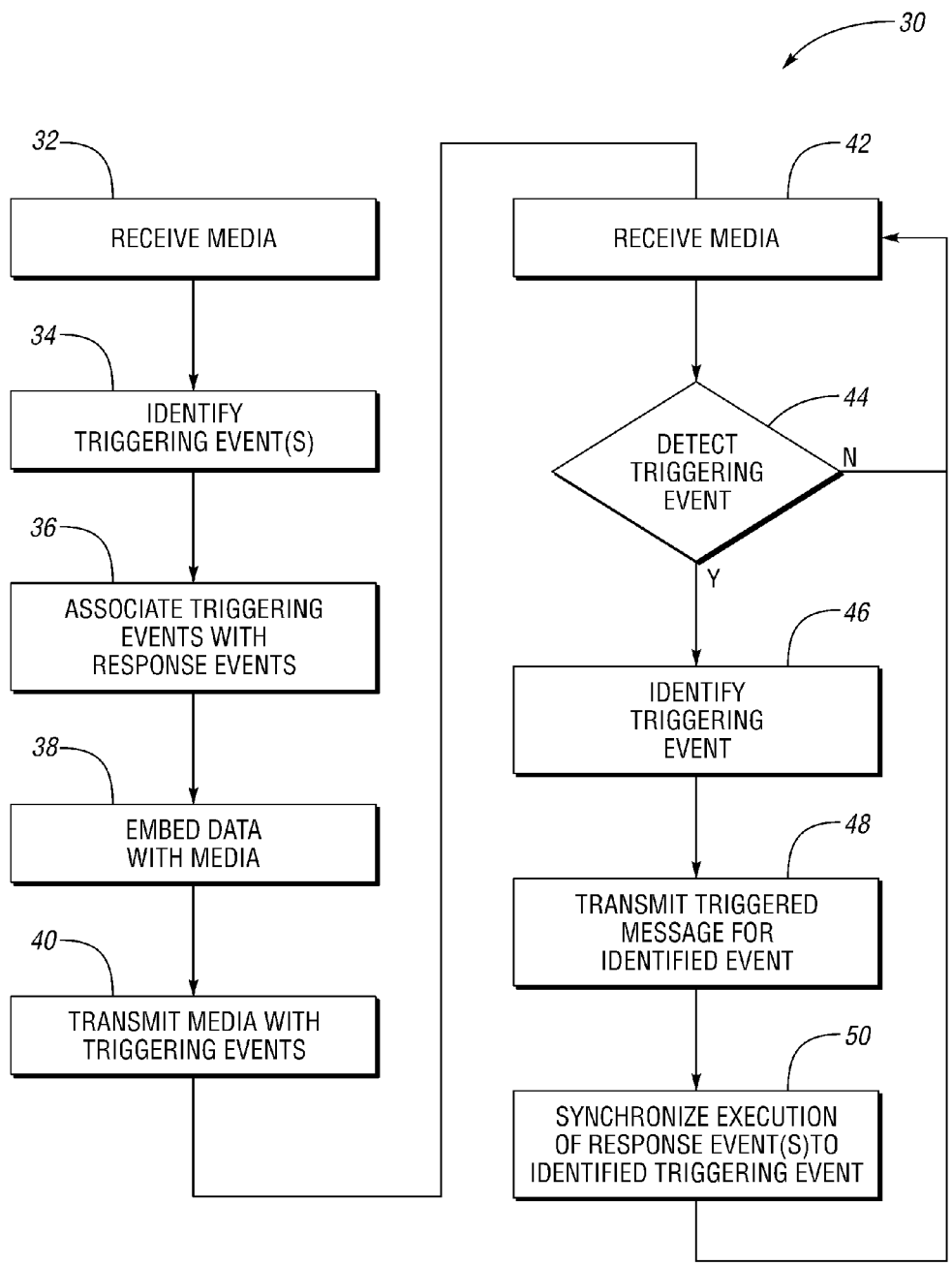
FIG. 2 illustrates a flowchart of a synchronization method in accordance with one non-limiting aspect of the present invention.

FIG. 2 illustrates a flowchart 30 of a synchronization method in accordance with one non-limiting aspect of the present invention. The method is described with respect to the media content being a television program and the synchronization thereof taking place between a receiver (primary device) 16 that tunes to television signaling for output to a television screen (primary screen) 14 and a tablet computer (secondary device) 20 that supports related interactive applications and functions through an associated display ($2^{nd}$ screen) 18. The controller 24, primary device 16, and/or secondary device 20 may include logic or other processing capabilities necessary to implement the operations contemplated to execute the present invention, such as in the form of executable code stored within a computer readable medium.

Block 32 relates to the media source 12 receiving media content for subsequent delivery to the primary device 16. The media source 12, i.e., the source responsible for delivering the media content to the primary device 16, may receive the content from a studio, network broadcaster, DVR, or other media source, such as a website. The received media content may be processed and/or otherwise manipulated by the media source 12 for transmission to the primary output device 16 according to the related communication medium and/or communication requirements and output capabilities of the primary device 16. Optionally, in the case of direct broadcast, the media content may be transmitted directly to the primary device 16.

Block 34 relates to the media source 12 identifying or otherwise associating one or more triggering events with the received media signals. The triggering events may be markers, pointers or other data structures associated with the particular scene, action, event, context, or function taking place in the corresponding media, e.g., in the case of media content being a television program, the triggers may correspond with start and ending markers used to designate certain periods within the program, including those that corresponding with a beginning and ending of the program, commercial breaks, key scenes, product presentations/usage, etc. SCTE 35 is a widely used standard used in the cable industry to encode such triggers. CableLabs's ETV-EISS provides another such mechanism. Of course, the trigger events may be embedded with the media prior to receipt by the media source 12 such that the media source 12 may not need to embed the triggering events.

Block 36 relates to the media source 12 identifying or associating one or more response events with one or more of the triggering events. The response events may correspond with triggers or other prompts to the secondary device to take some particular action or to implement some particular function in response to one or more of the triggering events, such as to display an advertisement, run an application, prompt the user to vote on a prompted question, to mark user requests with displayed content, to provide additional material regarding the content, such as actor profile, to provide links to related video, to offer the opportunity to rate the content, to offer the ability to 'share' the content by sending the title or a navigable link (URL) to another person.

Other data structures may be included or otherwise added to the media content in Block 38 prior to transmission to the primary device 16, such as but not limited to executable code or data, such as but not limited to eTV Binary Interchange Format (EBIF) information and other data suitable to being used by the secondary device in supporting some or all of the $2^{nd}$ screen user experience. Other information, such as a viewing definition (standard or high definition) of the media content may be identified so that the secondary device 20 can present a properly formatted user interface to match the aspect ratio of the TV, contextual information and/or information about the viewers subscription tier could be identified to allow the secondary device to offer an upsell to the viewer.

Block 40 relates to transmitting the media content and embedded information (triggering events, response events and/or additional data) to the primary device 16 for playback. Optionally, some or all of the embedded-type information may be transmitted as part of the television signal and/or through some other communication, such as but not limited to separate IP or packet-based communication, out-of-band (OOB) messaging, and the like. For example, rather than transmitting the response events and the executable code to the primary device 16, the media source 12 and/or the synchronization controller 24 may transmit the corresponding data directly to the secondary device 20.

Block 42 relates to the primary device 16 outputting the media content for playback to a user. The primary device 16 may perform a tuning operation and/or execute any other operation necessary to output the media content. Block 44 relates to the primary device monitoring the related signaling for the triggering events. Optionally, occurrence of one or more of the triggering events may be detected by synchronization controller 24 or another device, such as by tracking playback of the television program independently of any tracking performed by the primary device 16. Of course, events other than the embedded triggering events may be used to prompt transmission of messages similar to the triggered messages, such as in response to user interaction with the primary device 16 through a remote control, or any internal logic of an application on the primary device.

In the event no triggering event is detected by the primary device 16, the process remains in Blocks 42, 44. In the event a triggering event is detected, Block 46 relates to the primary device 16, or other identifying device such as but not limited to the synchronization controller 24, identifying the corresponding triggering, such as from the information embedded with the media signaling tuned to by the primary device 16.

Block 48 relates to the primary device 16, or other identifying device such as but not limited to the synchronization controller 24, transmitting a triggered message in response to the detected triggering event. The triggered message may include information regarding the triggering event that prompted the message, such as a title of the event, a timestamp, such as beginning or ending timestamp that marks the beginning or end of the television program or an event timestamp that marks occurrence of the triggering event relative to a counter set from the beginning of the media content and/or the beginning timestamp. Optionally, the triggered message may include executable code or other data structures (e.g., an Internet web page) for use by the secondary device in facilitating a related $2^{nd}$ screen experience, which may be added by the primary device 16, synchronization controller 24, and/or some other device or hop within the transmission path to the secondary device 20.

The triggered message may be transmitted to the synchronization controller 24 over the communication medium or similarly controlled medium used to transmit the media content to the primary device 16, such as through OOB messaging. The synchronization controller 24 may then communicate the triggered message, as is, with additional data or manipulation depending on the needs of the secondary device 20, to the secondary device 20 through any suitable communication medium. In the case of cable television or other closed network mediums, this may require the synchronization controller 24 to be included as part of the cable network or otherwise having capabilities to communication with the primary device 16 through the same medium or controlled access used to transmit the media content to the primary device 16. Optionally, the primary device 16 may communicate the triggered message directly to the secondary device 20, i.e., without relying the synchronization controller 24, such as through a local wireless network and/or through other internet or mobile phone based communications.

Block 50 relates to the secondary device 20 synchronizing one or more response events according to the one or more triggering events identified within the transmitted triggered message. The synchronizing contemplated by one non-limiting aspect of the present invention relies upon the primary device 16 to transmit one or more triggered messages upon detecting one or more corresponding triggering events. The triggered messages can then be transmitted to and used by the secondary device 20 to synchronize its function to the triggering events identified in the triggered message. The secondary device 20 can instigate the related function(s) upon receipt of each triggered message such that the function executing on the secondary device 20 occurs almost instantaneously to the corresponding event in the primary screen.

In this manner, any corresponding latency between detecting the triggering event with the primary device 16 and executing the related response event with the secondary device 20 would result from the time taken to transmit the triggered message from the primary device 16 to the secondary device 20. Advantageously, the time taken to transmit the triggered message to the secondary device 20 may be relatively short and result in any delay being unnoticeable to the user and/or of such a minimal nature that the quality of the user experience is high. In the event the latency in the transmission of the triggered messages is greater than desired, the secondary device 20 may make additional adjustments to counteract the latency, such as by adjusting timing of subsequent response even to occur at a fixed point in time instead of having to await receipt of the corresponding triggered message.

Figure 3:
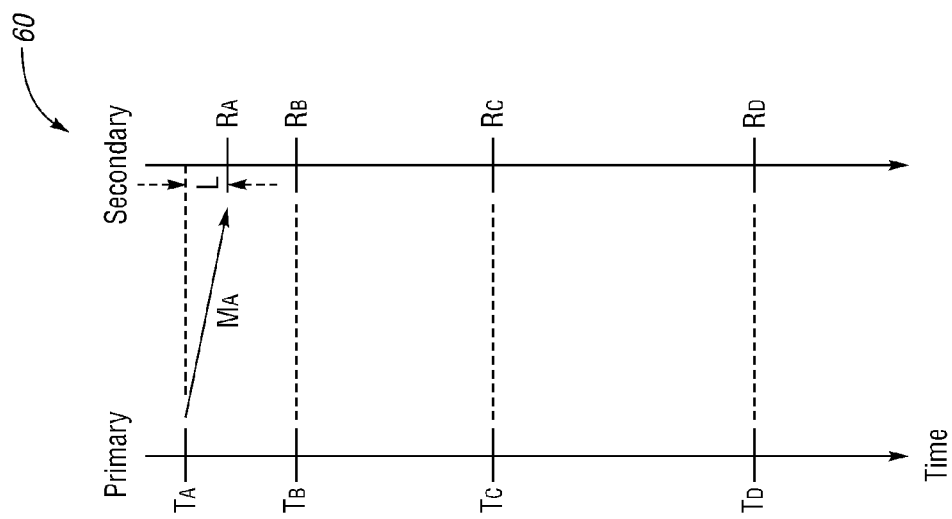
FIG. 3 illustrates one-to-many synchronization timeline for synchronizing multiple response events in accordance with one non-limiting aspect of the present invention.

FIG. 3 illustrates synchronization timeline 60 for synchronizing multiple response events from a single triggered message in accordance with one non-limiting aspect of the present invention. The synchronization timeline 60 labels the plurality of response events as $R_A$, $R_B$, $R_C$, and $R_D$ and the corresponding triggering events as $T_A$, $T_B$, $T_C$, and $T_D$. The response events $R_A$, $R_B$, $R_C$, and $R_D$ may be synchronized from a single triggered message $M_A$ being transmitted from the primary device 16 to the secondary device 20. A time schedule used by the secondary device 20 to schedule execution of the response event may be counted from receipt of the triggered message $M_A$.

The time period, or latency, associated with transmission of the triggered message is labeled L. As shown, the response event $R_A$ executes at some point after the corresponding triggering event $T_A$ in an amount approximately equal to the latency L. The subsequent response events, $R_B$, $R_C$, $R_D$, may be timed from receipt of the first triggered message $M_A$ so that the response execute at approximately the same time as the corresponding triggering events, $T_B$, $T_C$, $T_D$, are scheduled to occur. The timing of the subsequent response events may be correlated with a timestamp or other information included within the triggered message $M_A$ that indicates a period in time at which the triggered message $M_A$ was transmitted. This timestamp can be compared to a received time marked by the secondary device 20 at the time of receiving the triggered messages $M_A$ to determine the corresponding amount of latency L.

The latency amount L can then be used to set the execution timing of the one or more of the following response events $R_B$, $R_C$, $R_D$. The scheduling of the response events may set according to information included within the triggered message $M_A$ and/or to a schedule otherwise downloaded to the secondary device 20. This one-to-many capability allows the response events to be scheduled and executed without awaiting receipt of another triggered message and in close synchronization with the events and other actions taking place with the television program. It is believed that this level of synchronization will enhance the $2^{nd}$ screen user experience by allowing time sensitive events to take place in the second screen 18 without any or very little offset from corresponding events in the primary screen 14.

Figure 4:
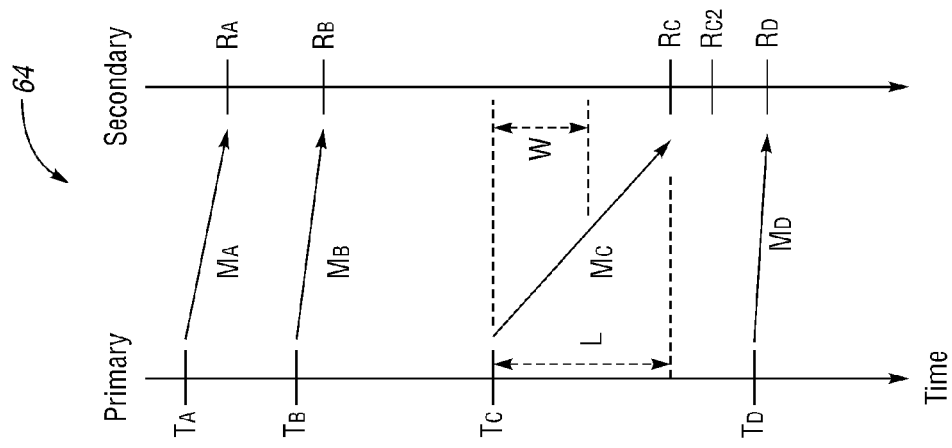
FIG. 4 illustrates one-to-one synchronization timeline for synchronizing multiple response events in accordance with one non-limiting aspect of the present invention.

FIG. 4 illustrates one-to-one synchronization timeline 64 for synchronizing multiple response events relative to receipt of a corresponding number of triggered messages in accordance with one non-limiting aspect of the present invention. Each of the response events $R_A$, $R_B$, $R_C$, and $R_D$ are triggered by the primary device 16 detecting occurrence of corresponding triggering events $T_A$, $T_B$, $T_C$, and $T_D$ and transmitting corresponding triggered messages $M_A$, $M_B$, $M_C$, $M_D$. The latency associated with each of the triggered messages $M_A$, $M_B$, $M_C$, $M_D$ is reflected in the slope of the corresponding reference line. The differing slope of each reference line represents the possible transient nature of latency induced timing delays associated with transmitting the triggered message to the secondary device 20.

In some cases, either in the corresponding triggered message or in information otherwise provided to the secondary device 20, an execution window W may be associated with each of the response events $R_A$, $R_B$, $R_C$, and $R_D$. For exemplary purposes the execution window is shown with respect to the response $R_C$. The execution window W represents a desired period of time in which the response event $R_C$ is to execute related to the triggering event $T_C$. If the corresponding triggered message is received outside of the execution window W, the secondary device 20 is instructed to take some other action, such as not executing the assigned response event $R_C$, maintaining its current state, and/or executing a replacement or backup event $R_{C2}$.

Figure 5:
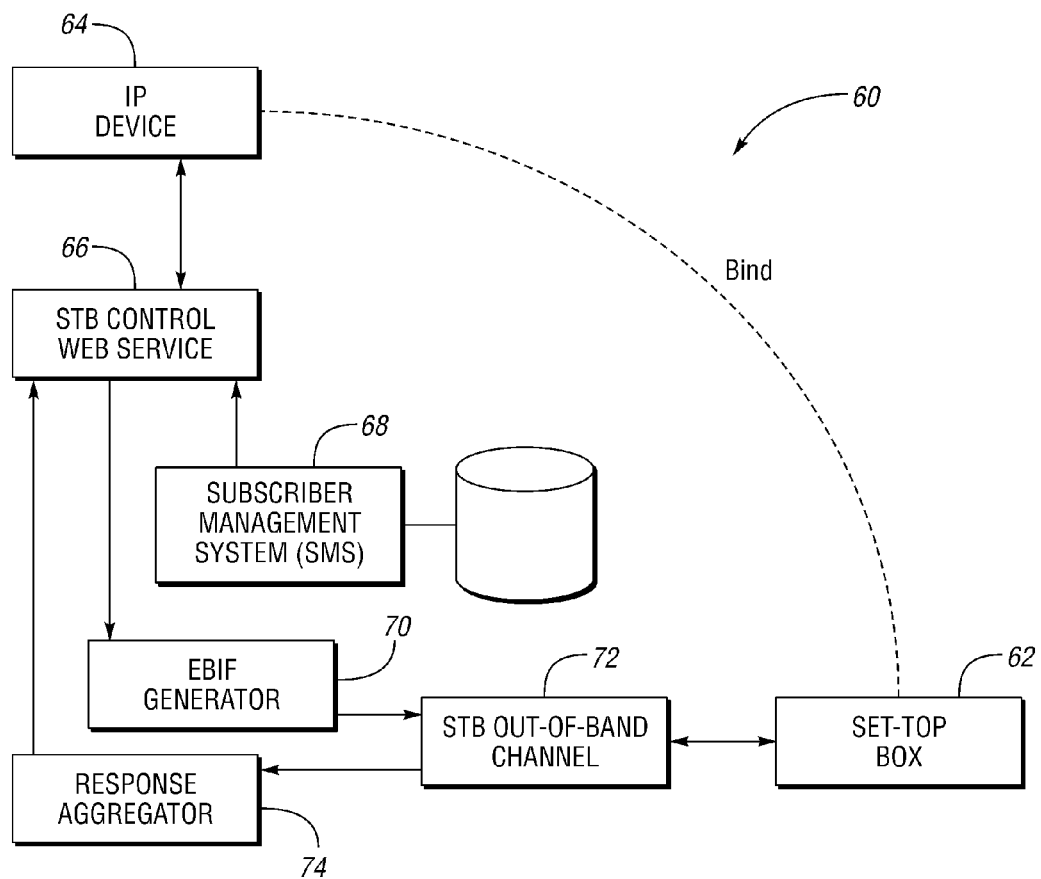
FIG. 5 illustrates an architecture to support 2$^{nd}$ screen synchronization between a set-top box (STB) and IP device in accordance with one non-limiting aspect of the present invention.

FIG. 5 illustrates an architecture 60 to support $2^{nd}$ screen synchronization between a set-top box (STB) 62 and IP device 64 in accordance with one non-limiting aspect of the present invention. The IP device 64 may be a tablet pc, computer, mobile phone, etc. having capabilities to support IP or other related communications with a STB control web service 66. The STB control web service 66 may be device, server, or other element capable of facilitating communications between the STB 62 and the IP device 64 via server provider network (not shown) or other medium used to provide television or other signaling to the STB 62 for output to a television or other device (not shown). A subscriber management system (SMS) 68 may include a memory or database to store subscriber information associated with a subscriber operating the STB 62. The information may relate to applications, preferences, purchases, etc. of the subscriber that are to be used in governing or otherwise facilitating a $2^{nd}$ screen experience on the IP device 64 relative to events taking place through STB.

The STB control web service 66 may operate in cooperation with an EBIF generator 70 to facilitate adding or otherwise including eTV and other enhanced services to the signaling provided to the STB 62, such as but not limited to selecting services and/or including information sufficient for use by the STB 62 in facilitate the $2^{nd}$ screen synchronization contemplated by the present invention. In the event OOB messaging or similar "back channel" or proprietary signaling is required to support communications with the STB 62, at leas it may relate to operations contemplated by the present invention, a STB OOB channel 72 may be constructed between the EBIF generator 70 and the STB 62. A response aggregator 74 may also communicate through the OOB channel 72 to support communicating event messages via the service provider between the IP device 64 and the STB 62 in order to synchronize activities of the IP device 62 relative to events taking place through the STB 62. Optionally, similar messaging may take place directly between the STB 62 and the IP device 64, such as through a wireless or wireline communication medium binding the IP device 64 with the STB 62.

As supported above, one non-limiting aspect of the present invention relates to an interactive television strategy of enhancing a program presenting an associated user experience on a so-called 2nd screen, such as a PC or mobile device such that the 2nd screen presentation is synchronized with a corresponding television presentation. One non-limiting aspect of the present invention provides a mechanism to deliver application assets and signals to a secondary device to enable accurate synchronization of a 2nd screen application to a television program. Because of the inherent latencies in TV transmission and presentation, synchronization signals may be generated by the TV receiver in a viewer's home and transmitted to the secondary device over the Internet. While this incurs some latency in signal transmission, the latency may be tolerably small and consistent for almost all applications.

One non-limiting aspect of the present invention relates to an application on a TV receiver is alerted when a signal embedded in a programming stream is encountered. This application in turn sends a signal upstream. A server hosted by a service operator or application provider receives the signal from the TV receiver and in turn sends one or more messages to the secondary device. The receipt of these messages by an application on the secondary device enables the application to maintain synchronization with the television program. These messages might also contain application assets, in the form of executable code, data, or other. In this way, EBIF or other applications could be supported on the secondary device.

This method may be used to enable another sort of synchronization to programming, in addition to temporal synchronization. Because application signaling and asset distribution to a secondary device may be initiated by the TV receiver or headend aware of tuning prior to the tuning actually taking place, and hence what a viewer is currently watching on TV, applications on the secondary device can be synchronized to the TV experience in terms of content as well. Instead of launching a 'Lost' of other television program specific application on an iPad after tuning into the show, an iPad app could simply detect, through this method, that 'Lost' is on and present the appropriate user experience.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of synchronizing an application showing on a second (2nd) screen of a secondary device with a television program showing on a primary screen associated with a primary device, the primary device outputting the television program according to tuned-to television signals, the method comprising:

specifying a first triggering event, a second triggering event and a third triggering event within the television signals, the second triggering event occurring after the first triggering event and the third triggering event occurring after the second triggering event;

specifying a first event, a second event and a third event to be executed at the application simultaneously with the corresponding one of the first, second and third triggering events, including specifying a first elapse period and a second elapse period, the first elapse period specifying an amount of time at which the second event is to execute after the first event, the second elapse period specifying an amount of time at which the third event is to execute after the second event;

facilitating transmission of a first event triggered message from the primary device upon the primary device detecting occurrence of the first triggering event, the first event triggered message indicating occurrence of the first triggering event as detected by the primary device;

synchronizing execution of the first, second and third events at the secondary device relative to transmission of the first event triggered message, including facilitating the secondary device to:

calculate a latency amount associated with transmission of the first event triggered message, the latency amount identifying an amount of time elapsing between the primary device transmitting the first event triggered message and the secondary device receiving the first event triggered message; and shorten the first elapse period by an amount of time equal to the latency amount such that the second event executes at the application simultaneously with the second triggering event and the third event executes at the application simultaneously with the third triggering event.

2. The method of claim 1 further comprising the first event being executed immediately at the secondary device upon the secondary device receiving the first event triggered message, thereby resulting in the first event executed at the secondary device lagging occurrence of the triggering event at the primary device by an amount of time approximately equal to the latency amount.

3. The method of claim 1 further comprising facilitating:
specifying an execution window for the first event, the execution window specifying a first amount of time after occurrence of the first triggering event during which the first event is to execute at the application;
executing the first event at the application if the latency amount is less than the first amount; and
executing a backup event at the application instead of the first event if the latency amount is greater than the first amount.

4. The method of claim 1 further comprising facilitating execution of the second event and the third event at the application independently of a second event triggered message and a third event triggered message, the second event triggered message being transmitted from the primary device upon occurrence of the second event and the third event triggered message being transmitted for the primary device upon occurrence of the third event.

5. The method of claim 1 further comprising the secondary device calculating a first value for the latency amount if the first event triggered message is transmitted directly from the primary device to the secondary device and a second value for the latency amount if the first event triggered message is transmitted indirectly from the primary device to the secondary device, the second value being greater than the first value.

6. A method of synchronizing response events to be executed by an application associated with a second (2nd) screen of a secondary device relative to triggering events occurring during a media showing on a primary screen associated with a primary device, the media including a plurality of trigger events that prompt the primary device to transmit a triggered message, the secondary device being provided response events to be executed with the application in concert with the primary device detecting the triggering events, each response event being uniquely associated with one or more of the triggered messages, the method comprising:
determining a latency value for triggered messages transmitted from the primary device, the latency value identifying an amount of time elapsing between the primary device transmitting one of the one or more triggered messages and the secondary device receiving said one of the one or more triggered message; and
setting an execution time for at least some of the response events according to the latency value, the execution time specifying when the application is to execute the corresponding response events in order to compensate for time taken to transmit the corresponding triggered event to the secondary device.

7. The method of claim 6 further comprising transmitting the triggered messages indirectly from the primary device to the secondary device by way of a service provider, the service provider being configured to source signaling used to transmit the media content to the primary device.

8. The method of claim 6 further comprising transmitting the triggered messages directly from the primary device to the secondary device.

9. The method of claim 6 further comprising including executable code with at least one of the triggered messages, the executable code specifying one or more operations to be performed by the application as at least part of executing the corresponding response event.

10. The method of claim 6 further comprising including a time stamp with at least one of the triggered messages for use by the application in calculating the corresponding latency value, the time stamp marking time when the corresponding triggered message was transmitted from the primary device, the application comparing the time stamp with a receipt time to determine the latency value, the receipt time marking time when the corresponding triggered message was received at the secondary device.

11. The method of claim 6 further comprising including information regarding a characteristic of the primary device or a subscriber associated with the primary device within one or more of the triggered messages, the secondary device having at least two options for executing the associated response event such that selection of one of the at least two options is dependent on the characteristic.

12. The method of claim 6 further comprising calculating the latency value with a synchronization controller located remote from the primary device, the synchronization controller relaying the triggered messages from the primary to the secondary device.

13. The method of claim 6 further comprising compensating for time taken to transmit the triggered messages by setting the execution time of at least one unexecuted response event to occur prior to receipt of the associated triggered event message, the unexecuted response event being scheduled to occur after the response event associated with a previously received triggered message.

14. The method of claim 6 further comprising compensating for time taken to transmit the triggered messages by:
setting the execution time of one of the response events associated with a received triggered message to immediately execute if the latency value for the received triggered message is less than a threshold;
preventing the one of the response events to execute if the latency value for the received triggered message is greater than the threshold.

15. The method of claim 14 further comprising executing an alternative response event if the latency value for the received trigger message is greater than the threshold.

16. The method of claim 14 further comprising executing an alternative response event if the latency value for the received trigger message is greater than the threshold.

17. A method of synchronizing an application showing on a second (2nd) screen of a secondary device with media showing on a primary screen associated with a primary device, the media being sourced to the primary device from a media source, the method comprising:
specifying one or more triggering events within signaling of the video program;
specifying one or more response events to be executed at the application synchronization with the one or more triggering events, including specifying an execution time for each response event to occur at a particular time of day anticipated to coincide with the primary device detecting occurrence of the corresponding one or more triggering events;
adjusting the execution time for at least some of the response events according to latency associated with transmission of the media from the media source to the primary device in order to synchronize execution of at least some of the response events to occur at the same time as the corresponding triggering events, including delaying the execution time for at least some of the response events to occur after the specified time of day.

18. The method of claim 17 further comprising:
specifying an occurrence time for each triggering event to coincide with the anticipated time of day at which the primary device is anticipated to detect occurrence of the corresponding triggering event;
delaying the execution by a latency value, the latency value being approximately equal a difference in time measured between a timestamp marking a transmission time of day at which a triggered event message was transmitted from the primary device in response to detecting occurrence of one of the triggering events and the anticipated time of day specified for that triggering event.

19. A method of synchronizing an application showing on a second (2nd) screen of a secondary device to a television program showing on a primary screen associated with a primary device, the primary device outputting the television program according to tuned-to television signals received from a television service provider, the method comprising:
receiving a first event triggered message at the secondary device, the first event triggered message being transmitted from the primary device upon the primary device detecting occurrence of a first event within the tuned-to television signals;
determining a latency amount associated with transmission of the first event triggered message from the primary device to the secondary device, the latency amount identifying an amount of time elapsing between the primary device transmitting the first event triggered message and the secondary device receiving the first event triggered message;
setting an execution time for a first response and a second response to be executed with the application according to the latency amount, such that one of the first response and the second response is executed simultaneously with the trigger event;
executing the first response with the application if the latency amount is less than a first value; and
executing the second response with the application if the latency amount is greater than the first value.

20. The method of claim 19 further comprising determining the latency amount to be equal to a difference in time between a first timestamp determined by the primary device to mark transmission of the first event triggered message and a second timestamp determined by the secondary device to mark receipt of the first event triggered message.

21. The method of claim 19 further comprising identifying the first response and the second response from application assets transmitted to the secondary device from the television service provider.

22. The method of claim 21 further comprising the application assets specifying a third response and a fourth response to be executed with the application relative to the primary device detecting occurrence of the first event.

23. The method of claim 22 further comprising the application assets scheduling the third response to follow execution of the first response and the fourth response to follow execution of the third response, the third response being scheduled to execute after a first amount of time is counted from execution of the first response.

24. The method of claim 23 further comprising adjusting execution of the third response relative to the scheduling specified within the application assets such that the application executes the third response prior to the first amount of time being counted from execution of the first response.

25. The method of claim 24 further comprising executing the third response at a second amount of time counted from execution of the first response, the second amount being approximately equal to the first amount minus the latency amount.

* * * * *